Dec. 13, 1955  R. R. RANEY  2,726,663
CLOD AND HAULM REMOVING MEANS FOR POTATO HARVESTERS
Filed Dec. 2, 1952  3 Sheets-Sheet 1

INVENTOR.
Russell R. Raney
BY
Paul O. Pippel Atty.

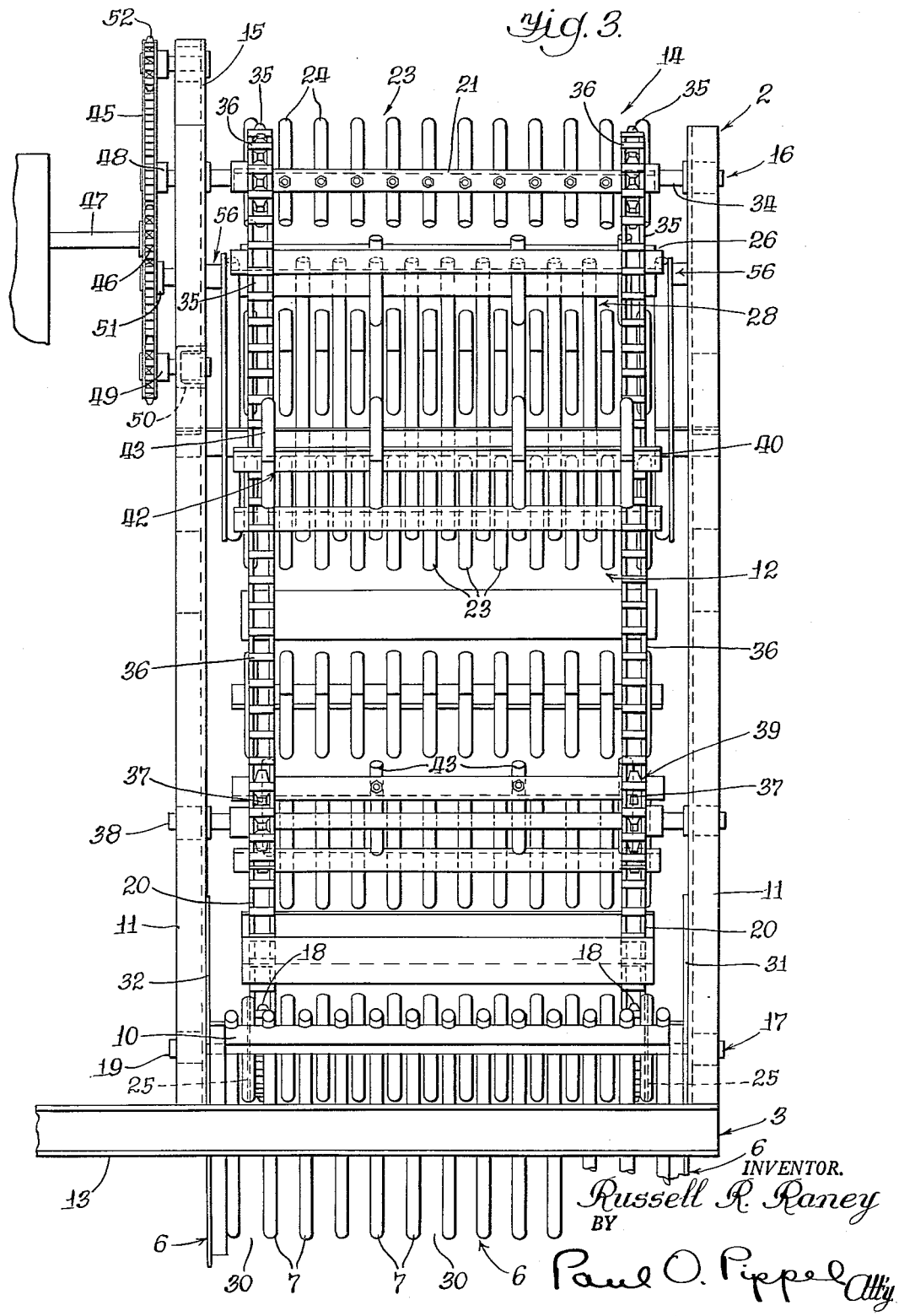

United States Patent Office 2,726,663
Patented Dec. 13, 1955

2,726,663

CLOD AND HAULM REMOVING MEANS FOR POTATO HARVESTERS

Russell R. Raney, Western Springs, Ill., assignor to International Harvester Company, a corporation of New Jersey Application December 2, 1952, Serial No. 323,534

3 Claims. (Cl. 130—30)

This invention relates to a potato harvester and more particularly to a novel means for removing large clods and haulm from the potatoes in an aggregate scooped up by the digger shovel as the machine travels down a field.

A general object of the invention is to devise a novel and simple clod-removing mechanism of a type which will operate efficiently and is relatively inexpensive to manufacture.

A more specific object of the invention is to devise a clod-removing means wherein the mechanism comprises an elevator conveyor including a series of buckets constituted of a plurality of laterally spaced tynes, the buckets being part of an endless chain system, and the clod-removing mechanism also comprising a series of buckets on an endless chain system, the buckets of the clod-removing mechanism incorporating a plurality of widely spaced tynes which rake through the tynes constituting the buckets of the elevating conveying system to remove the large clods therefrom.

A further object of the invention is to devise a combination clod-removing and haulm stripping mechanism, wherein the fingers of the clod-removing buckets are adapted to comb through the buckets of the elevating conveyor and catch the vines on the potatoes and strip them off as the elevating and clod-removing buckets move away from each other over the upper ends of their paths of travel.

These and other objects of the invention will become more apparent from the specification and the drawings, wherein Figure 1 is a side elevational view of the novel mechanism incorporating the invention with associated parts shown in cross-section.

Figure 3 is a rear view of the mechanism.

Describing the invention in detail, the clod and vine removing mechanism generally designated 2 is shown in association with other components of the potato harvester generally designated 3, these components being generally indicated as delivery means 4 and discharge receiving means 5 and in the present instance the delivery means comprises a series of rollers serving as conveyors and haulm removing means.

Figure 1:
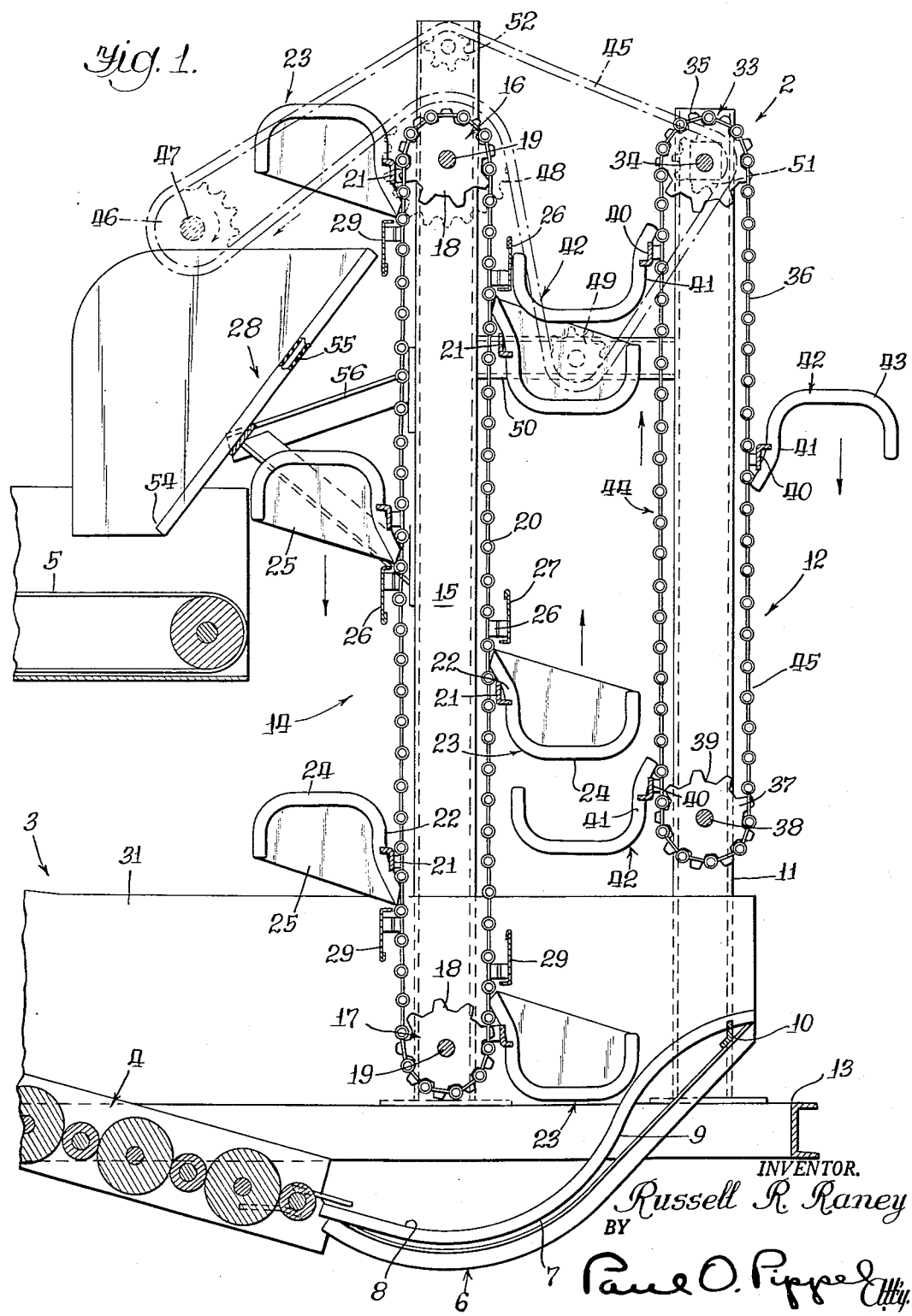
Figure 2:
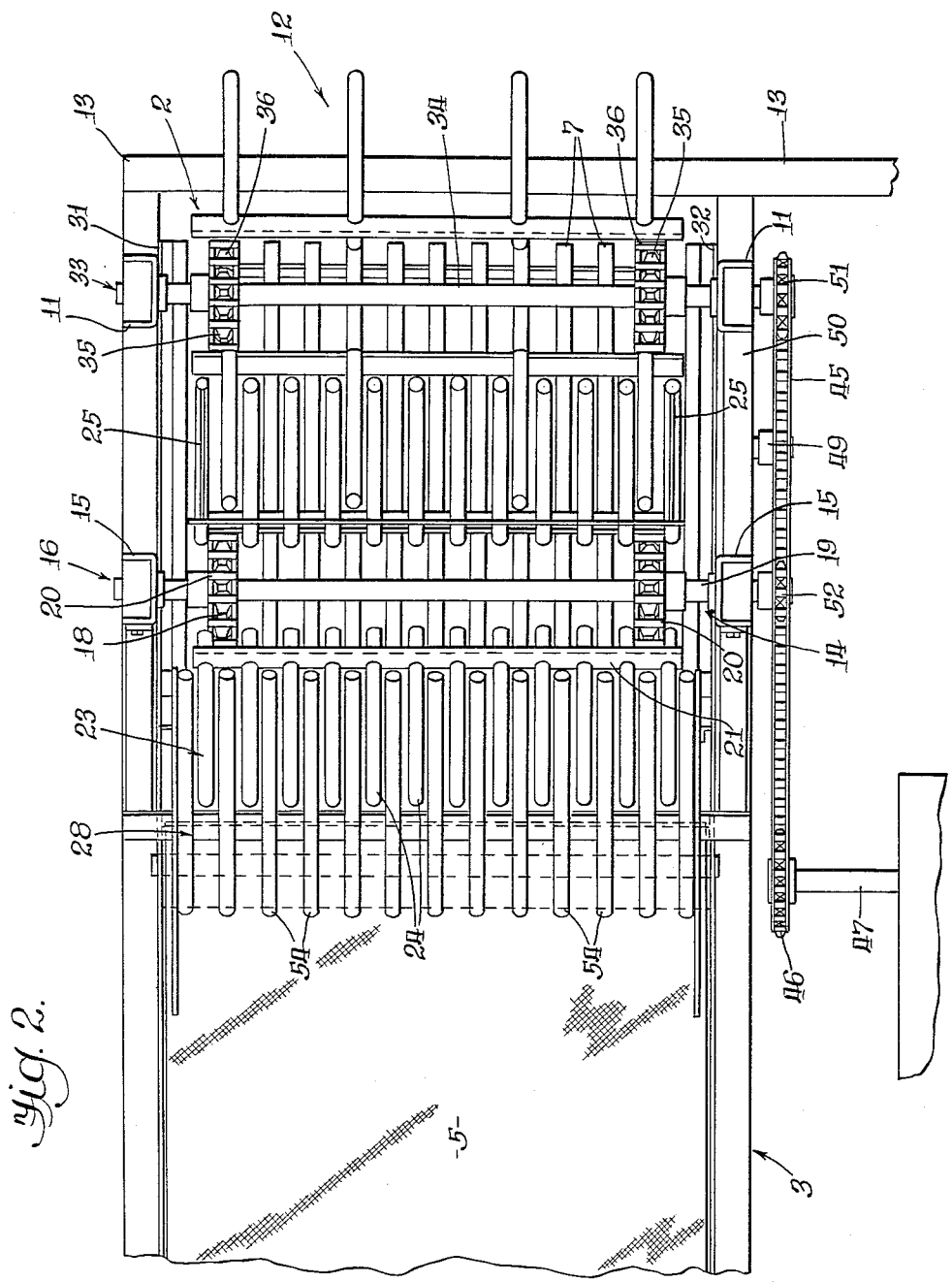
Figure 2 is a top plan view of the mechanism shown in Figure 1.

It will be noted from a consideration of Figure 1 that the component 4 delivers downwardly rearwardly into a trough or hopper generally designated 6, said trough comprising a series of laterally spaced bars 7, 7 which are convexed downwardly in receiving relationship to the component 4 to provide a trough bottom 8, the bars 7, 7 curving rearwardly from the backside 9 of the trough and at their upper rear ends being interconnected by a cross-bar 10 which is suitably connected at opposite ends to a pair of upright support stanchions or beams 11, 11 of the clod-removing mechanism generally designated 12, the beams or reach means 11, 11 being connected at their lower ends to an associated frame 13 of the potato harvester 3.

The trough 6 is disposed in vertical alignment with an elevator conveyor generally designated 14, said elevator conveyor comprising a pair of laterally spaced substantially upright support stanchions or beams 15, 15 which at their lower ends are suitably mounted and connected to the frame members of the framework 13 at longitudinally opposite ends of the trough 6. The stanchions 15, 15 rotatably mount adjacent to their upper and lower ends sprocketed cross-shaft assemblies generally designated 16 and 17 and each sprocket assembly comprises a sprocket 18 adjacent to each end to which is secured a cross-shaft 19 journaled through suitable bearings in the stanchions 15, 15. The assemblies 16 and 17 support a pair of endless chains 20, 20 trained about the sprockets 18, 18 thereof and the chains 20, 20 along opposite sides of the conveyor 14 are interconnected at regularly spaced intervals by a series of cross-bars 21, 21 and each cross-bar 21 is connected to the backside 22 of an associated bucket or finger scoop 23 which is composed of a series of laterally spaced tynes 24, 24, the tynes 24 at opposite ends of each bucket being interiorly connected to generally vertical plates 25, 25 which close opposite ends of the bucket for containing the potatoes and the aggregate within the bucket. It will be seen that the upper back edge of each bucket 23 is curved inwardly toward the supporting framework 15 and that immediately above the inner upper edge of each finger scoop 23, that is in the downstream direction with respect to the direction of movement of the endless chain system, there are disposed mounting clips 26 on the outward sides of chains 20, 20 carrying a flat plate 27 which in effect constitutes an extended projection of the back interior side of the bucket immediately upstream thereof and functions to align with the interior backside of this bucket when it is passing over the upper sprocket assembly 16 in discharging relationship to the inclined chute structure 28 such that the potatoes and other aggregate will be guided from the internal backside of this bucket along the outer face 29 of the adjacent guide strip 27 onto the upper extent of the diagonally downwardly sloping chute structure 28. This positively prevents the potatoes or other debris from entering between the upper extents of the chute structure 28 and the adjacent side of the elevator conveyor 14.

It will be seen that the elevator conveyor 14 orbits about the horizontal shaft 19, 19 of the sprocket assemblies 16 and 17 and that the empty buckets on the descending side of the elevator conveyor open downwardly and at the lower end of the conveyor scoop through the trough in the direction of flow of the potatoes and the aggregate from the delivery conveyor 4 into the trough and that in view of the fact that these finger scoops 23 are moving in an arc at the lower end of the elevator the swing through the trough 6 is rapid, which, in addition to picking up the potatoes and aggregate, also tends to sift out some of the dirt through the spaces 30, 30 between the tynes 7, 7 of the trough 6. On the ascending side of the elevator conveyor 14 the finger scoops 23, of course, are filled and contain the potatoes and aggregate and are opened upwardly.

Along said ascending side is positioned the combination clod removing and haulm stripping conveyor mechanism 12. The mechanism 12 as heretofore indicated comprises the stanchions 11, 11 receiving side panels 31, 32 therebetween, said panels 31, 32 defining side shields and extending along the lateral extremes of the conveyor 4 and the opposite ends of the trough 6 for confining the material upon these components. The members 11, 11 carry between their upper ends a sprocketed roll assembly 33 comprising a shaft 34 journaled at opposite ends in suitable bearings in the elements 11, 11 and keyed to a sprocket 35 adjacent each end, each sprocket having a chain 36 trained thereabout and each chain being looped at its lower end under a sprocket 37 keyed to a shaft 38 of a lower sprocket assembly 39, the shaft 38 of which is journaled in suitable bearings to the elements 11, 11 adjacent to their lower ends. The chains 36, 36 are interconnected at regularly spaced intervals by cross-bars 40, 40 and each cross-bar 40 is connected to the backside 41 of a bucket or finger scoop 42 constituted of a plurality of widely spaced tyne or finger-like members 43 as contrasted with the closely spaced finger 24, 24 of the scoop assemblies 23 of the elevator conveyor. It will be seen that the side contours of the fingers 43 are generally similar to those of the fingers 23. As best seen in Figure 1, the mechanism 12 has an ascending side or run 44 positioned alongside the ascending run of the elevator conveyor 14 and a descending side 45 at the rear end of the machine and the buckets 42 thereof are caused to orbit on generally horizontal axes in a generally vertical plane and are arranged to sweep under the lower assembly 39 and ascend on the side adjacent to the ascending loaded side of the elevator conveyor. The speed of the chains 36 is so arranged as to enter each bucket 42 between successive pairs of buckets 23, 23 as the lower bucket of each of these pairs is moving out of the trough 6 and the upper bucket of the pair is intermediate the upper and lower extreme of the elevator conveyor 14 on its ascending side and the speed with which the buckets 42 are moved is such that it will overtake the bucket 23 thereabove and rake therethrough and in view of the wide spacing of its fingers 43 to lift the large clods of dirt or large stones.

This mechanism has been actually tested in the field and it has been found that the haulm on the potatoes still remaining after processing through the component 4 will catch on the fingers 43 and that when the clod bearing bucket swings rearwardly and the potato carrying bucket swings forwardly at the upper extremes of the respective conveyor mechanisms, the fingers 43 tend to strip these vines from the potatoes which are held within the associated bucket 23 which, at the upper extreme of its orbit, is facing with its open side forwardly. Thus, the fingers 43 perform a scavenging haulm removing function in addition to the removal of clods from the aggregate in the buckets 23.

The drive for both mechanisms is of course synchronized to achieve the results herein indicated and is herein shown in the form of a chain 45 which is trained about a sprocket 46 carried by an input shaft 47, the chain 45 having a lower run passing over the topside of a sprocket 48 which is keyed to one end of the shaft 19 of the upper roll assembly 16 of the elevator conveyor 14. The lower run of the chain 45 is passed under an adjustable idler 49 carried on a suitable brace member 50 connected between the adjacent stanchions 15 and 11 of the elevator conveyors 14 and 12. The chain 45 then extends diagonally upwardly around a sprocket 51, keyed to shaft 34, the chain having its upper run trained over an idler sprocket 52 carried by the adjacent member 15 at its upper end, and then the chain upper run continues to its initial end over the sprocket 46.

It will be readily appreciated that the operation of the novel mechanism herein described proceeds as follows. The aggregate is delivered from the component 4 into the trough bottom 8, while the elevator conveyor is orbiting so that each bucket or material holder scoops through the trough 6 and ascends upwardly on the rear side of the mechanism 14. As each bucket 23 emerges from the rear side of the hopper 6 the buckets or material holder 42 enter and interleave with the bucket 23 at the bottom extremity of the ascending side of conveyor 14 and the bucket 23 immediately thereabove. The buckets 42 traveling faster than the buckets 23 overtake the buckets 23 thereabove and rake therethrough and swing rearwardly away from the buckets 23 and dump the large clods or stones from the rear end of the machine. At the same time the bucket 23 through which a bucket 42 has passed begins to swing over the upper end of the mechanism 14 in a forward direction so that the potatoes are contained in the bucket 23 and any vines which may be caught on the finger scoop or the bucket that had just passed therethrough will strip off the potatoes. Immediately thereafter each bucket 23 passes over the upper sprocket assembly 16, spills downwardly and discharges all of the potatoes and remaining aggregate onto the chute structure 28 which is constituted of a series of laterally spaced generally parallel bars 54, 54 which are covered with soft sponge rubber sheathing 55 to prevent bruising of the potatoes as they are flung thereagainst by the buckets 23. This is an important feature of the present invention in that the chute structure 28 is disposed in a position whereat the speed of the buckets is abruptly changed, that is the buckets swing over the upper sprocket assembly in view of the fact that they are traveling about an arc and then suddenly slow down inasmuch as they are moving linearly just before the potatoes drop from their open sides onto the chute structure 28. It will be understood that the fingers 24 and that the bars 54 are spaced a suitable distance apart so as to accommodate interdigitation of the fingers 24 with respect to the fingers 54. The fingers 54 may be carried by any suitable structure such as the framework 56 which may be connected to the undersides of the bars 54 adjacent to their lower ends and to the stanchions 15.

I claim:

1. In a potato harvester mechanism for removing clods from potato-containing aggregate; a frame; an upwardly open hopper carried thereby; a first upright conveyor comprising a support structure mounted upon the frame, an endless chain assembly with finger scoops, means mounting the assembly upon the support structure for movement in an endless path to pass vertically through the hopper, said assembly having a generally vertical descending empty run on one side of the structure movable toward the hopper with the finger scoops open downwardly and an ascending filled run at the opposite side of the structure with the finger scoops open upwardly, a second conveyor carried upon the framework and comprising an endless chain assembly with finger scoops and having a stretch disposed in opposing relationship to said ascending run of the first conveyor and movable in the same direction therewith, said finger scoops on said first conveyor formed from a series of fingers laterally spaced close enough to hold the smallest potatoes desired and the finger scoops of the second conveyor formed from a series of fingers spaced wider than the largest potatoes desired to be retained in said scoops of the first conveyor and disposed in laterally offset relation to the fingers of the scoops of the first conveyor to pass between the fingers of the first conveyor, and means for driving said second conveyor faster than the first at a rate such that the scoops of respective conveyors interdigitate and each finger scoop of the first conveyor as it moves in the ascending run is raked through by only one finger scoop of the second conveyor to remove clods from the aggregate contained in the finger scoops of the first conveyor.

2. In a mechanism for removing dirt clods and haulm from a potato and dirt aggregate; a frame; a hopper carried thereby into which the aggregate is adapted to be delivered; a pair of first and second conveyors carried by the frame and each comprising endless chain means, said conveyors disposed in parallel relation and each having rectilinear ascending and descending stretches and arranged with the ascending stretches in opposed contiguous relation transversely separated and defining a vertically open space therebetween, a series of buckets on the endless chain means of each conveyor spaced lengthwise thereof, said buckets adapted to move through said space in said ascending runs of the respective conveyors, means for driving said conveyors in timed sequence so that the buckets of said conveyors intermesh at the lower ends of said ascending stretches and each bucket of the second conveyor overtakes and rakes through only the bucket thereabove in said space-catching haulm and clods before the same reach the upper ends of said ascending stretches, each bucket being constituted of a series of laterally spaced fingers, the fingers of the buckets of one conveyor spaced to each other close enough to retain the smallest potatoes desired and the fingers of the buckets of the other conveyor spaced wide enough to pass the largest potatoes desired and at a spacing to rake through the fingers of the buckets of the one conveyor, means supporting the chain means of respective conveyors from the frame in said relationship and with the buckets of said first conveyor in scooping relationship through the hopper, said ascending stretches having upper portions substantially the same level and diverging upwardly thereat whereby each bucket of the second conveyor separates from the bucket of the first conveyor through which it had just raked whereby stripping the haulm off the potatoes.

3. In a mechanism of the class described, a pair of upright conveyors and each comprising a support mounting on endless chain with a series of buckets thereon, each conveyor having ascending and descending runs, the ascending runs of said conveyors disposed adjacent to each other with the buckets thereon in interleaving relationship, each bucket of one of said conveyors comprising a plurality of tynes spaced close enough to retain the smallest potatoes desired and additively forming the bucket and each bucket of the other of said conveyors comprising relatively fewer tynes spaced wide enough to pass the largest potatoes desired and fashioned to form the bucket and positioned to pass between the tynes of the buckets of the one conveyor, and means for driving said one conveyor at a slower speed than the other conveyor at a rate whereby each bucket of the latter is adapted to comb through only the next preceding bucket of the former along said ascending run.

References Cited in the file of this patent
UNITED STATES PATENTS

| | | |
|---|---|---|
| 267,959 | Wiltse | Nov. 21, 1882 |
| 494,684 | Nicholson | Apr. 4, 1893 |
| 1,351,948 | Fowler | Sept. 7, 1920 |
| 1,662,467 | Minshall | Mar. 13, 1928 |
| 2,369,723 | Denlinger | Feb. 20, 1945 |